Sept. 12, 1961 J. HANKE 2,999,426
LENS SUPPORTING AND POSITIONING MEANS
Filed July 22, 1958 2 Sheets-Sheet 1
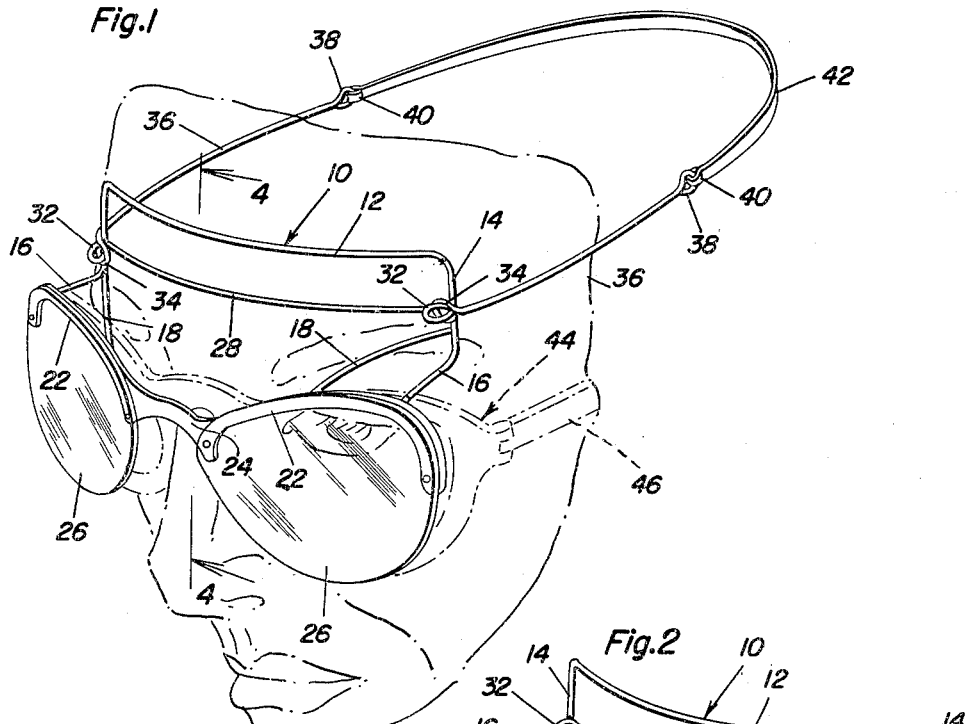
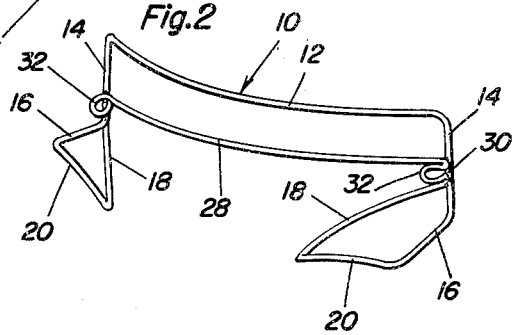
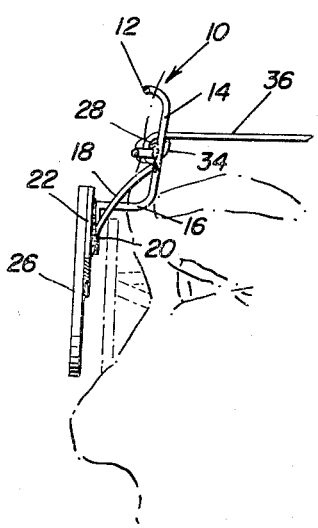
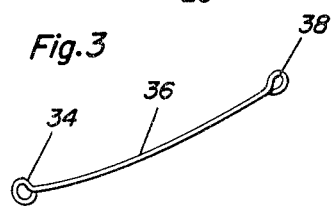
Joseph Hanke
INVENTOR.

Sept. 12, 1961   J. HANKE   2,999,426
LENS SUPPORTING AND POSITIONING MEANS
Filed July 22, 1958   2 Sheets-Sheet 2
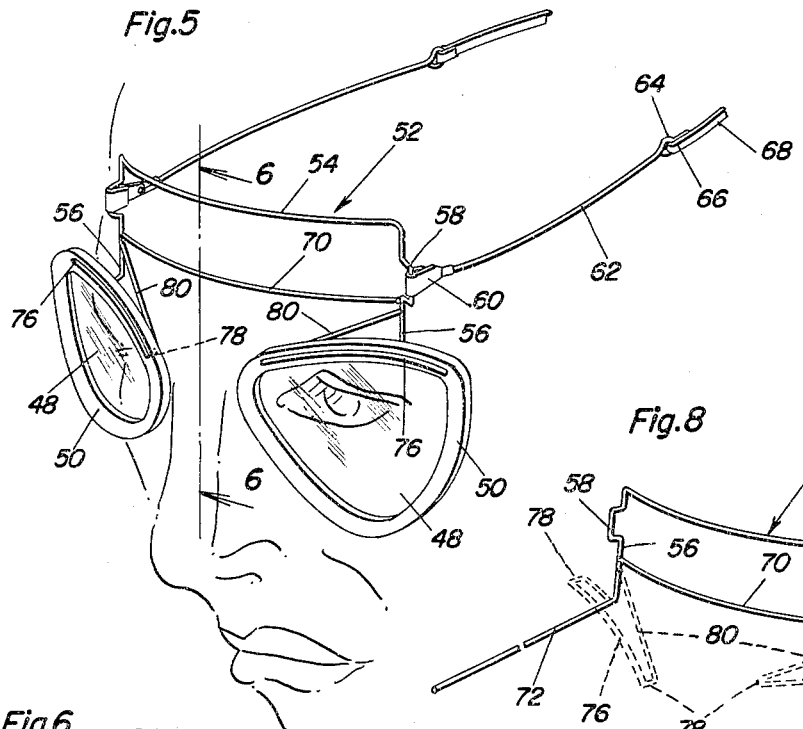
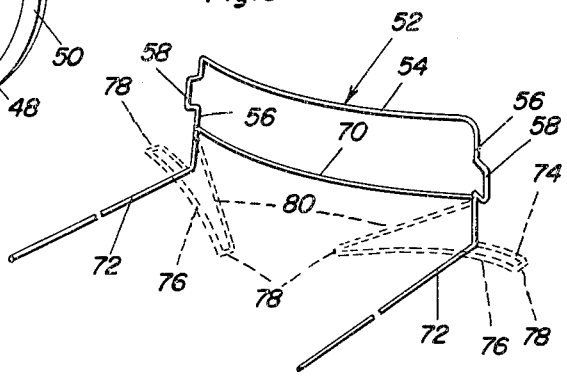
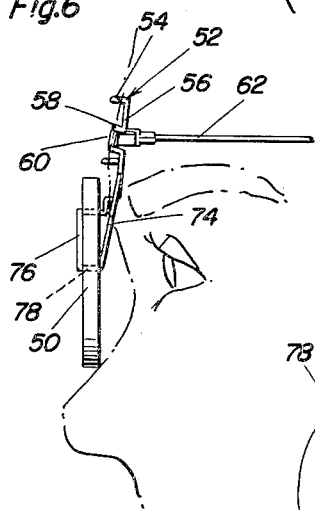
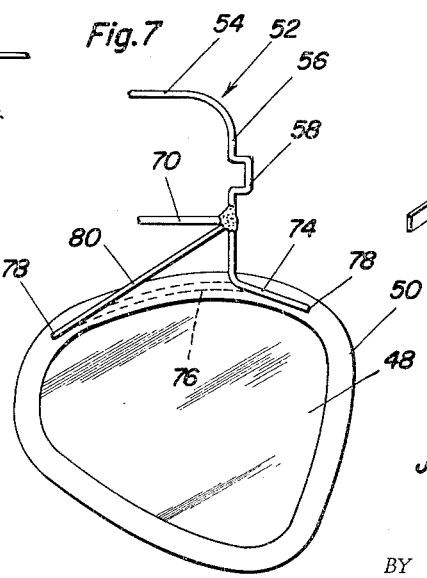
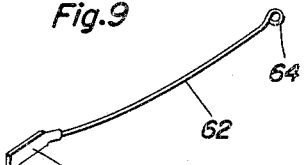
Joseph Hanke
INVENTOR.

United States Patent Office

2,999,426
Patented Sept. 12, 1961

2,999,426
LENS SUPPORTING AND POSITIONING MEANS
Joseph Hanke, 3349 N. Avers Ave., Chicago, Ill.
Filed July 22, 1958, Ser. No. 750,193
3 Claims. (Cl. 88—51)

This invention relates to eyeglasses, broadly interpreted, but pertains, more specifically, to lens positioning and supporting or suspending means whether the lenses are of the prescription type or those used for example in miscellaneous sun glasses. As may perhaps be evident after having read the preceding general statement of the nature of the subject matter under consideration, instead of mounting the lenses in frames, supporting the frames by an intervening nose contacting bridge, and retaining the frames in place by hingedly attached temples, the objective in the instant matter is to devise novel means which is such in construction that the lenses are carried by and hung from a practical harness embracing the wearer's head and locating the lenses in front of the respective eyes with which they cooperate.

In carrying out one embodiment of the concept under consideration sun glasses are uppermost for consideration. That is to say, the properly chosen sun intercepting lenses are attached in prerequisite paired relationship to hanger members which project forwardly beyond the forehead above each eye of the wearer. These hangers are preferably embodied in and constitute an integral part of an adapter frame. The frame is of suitably braced inverted U-shaped form and lends itself to conformable positioning against the user's forehead. An elastic band or strap and cooperating links constitute a simple and practical harness for retaining the adapter frame in place and forwardly offsetting and suspending the lenses.

The construction above briefly comprehended is highly desirable in that the adapter frame and harnessing means obviates the need for either bows or temples or a nose bridge. Also, the lenses, thus supported, are free of connection directly or indirectly with the spectacles with which they are then associated.

Another object of the invention, as already touched upon, is to provide a pair of regular or conventional prescription lenses and to support the same correctly located by way of the aforementioned forehead type adapter frame and the frame harnessing means, the free end portions of the arms or limbs of the frame being appropriately bent or otherwise constructed to have physical connection with the lens mounting or encompassing frames.

Other objects, features and advantages will become more readily apparent from the following description and the accompanying drawings.

In the drawings, wherein like numerals are employed to designate like parts throughout the same:

FIG. 1 is a perspective view of one embodiment of the invention showing sunglass lenses and the improved supporting and positioning means herein particularly stressed.

FIG. 2 is a perspective view of the adapter or alternatively, the adapter frame, that is, the type utilized in the construction depicted in FIG. 1.

FIG. 3 is a perspective view of a short but temple-like link employed on one side of the head embracing harness.

FIG. 4 is a section on the vertical line 4—4 of FIG. 1, looking in the direction of the arrows.

FIG. 5 is also a view in perspective and fundamentally similar to the embodiment seen in FIG. 1 but showing how the supporting and positioning means is effectually utilized in bringing regular framed prescription lenses into use.

FIG. 6 is a section taken on the plane of vertical line 6—6 of FIG. 5.

FIG. 7 is an enlarged fragmentary elevational view illustrating certain components of the adapter frame and showing how the same connects with the rim or frame of the eyeglass lens.

FIG. 8 is a perspective view of the wire or equivalent adapter frame showing an adaptation thereof before the terminal ends are joined with the lens frames.

FIG. 9 is a perspective view of one of the links of a type seen in FIG. 5.

By way of introduction to the detailed description it is to be mentioned that the concept, generically speaking, has to do with the aforementioned adapter or adapter frame, the harnessing means for the frame, a pair of lenses and means connecting the lenses in ready-to-use relationship with the adapter or frame whereby to avoid the use of commonly employed frames including a nose bridge and temples or bows. This interpretation is true whether the "lenses" are of the prescription or fitted type or of those that would be employed at random in the construction of sunglasses, goggles, blinkers and the like. With reference first to FIGS. 1 to 4, inclusive, the aforementioned adapter takes the form of an openwork frame 10. In experimental models non-corrosive wire has been employed in constructing the frame and the frame has generally been of inverted U-shaped form. Therefore, the frame comprises a horizontal elongated longitudinally bowed bight portion 12 and depending limbs or arm portions 14. The lower ends of the arm portions have forwardly and laterally directed lens spacing and offsetting bends 16 joined with return bends 18 by way of a connecting portion 20 thus defining triangulate connectors whose median portions 20 are welded or otherwise fixedly joined to the frame components 22 of the lens frame. Actually this frame includes a connecting bridge 24 but the latter is free of contact with the nose of the wearer. Stated otherwise, portions 22 and 24 provide a frame supporting the two sunglass lenses 26. The horizontal cross brace 28 has its end portions welded or otherwise secured at 30 to the limbs 14 where suitable loop-like hooks 32 are provided. These hooks are properly located and constructed to accommodate eyes 34 on the forward end portions of the temple-like links 36. The links are also provided at their rearward ends with similar eyes 38 to which adjacent ends 40 of an elastic head embracing strap 42 connect. The two links and elastic strap provide a simple harness which enables the user to base the adapter or frame 10 against the forehead in the manner shown in FIG. 1. The adapter is of a length that it balances the lenses in equidistant position in front of their respective eyes offsetting the lenses so that they are suspended or hung in front of the regular eyeglass lenses shown in phantom lines at 44. To facilitate identification of the "regular eyeglasses" a fragmentary portion of one temple or bow 46 is included.

As has already been set forth the adapter and harness, which together form the lens supporting and positioning means, is not restricted to use in conjunction with sunglasses but rather is just as important, perhaps more so, when constructed as usable in conjunction with eyeglasses and spectacles. With reference to FIGS. 5 to 9, inclusive, and with express consideration of FIG. 5 the numeral 48 designates one of a pair of regular eyeglass lenses. Each lens is mounted in a frame or rim 50. It is this framed or rimmed lens that is hung or suspended in the customarily intended position in front of the wearer's face. It is to be noted that there is no nose bridge connecting the frames 50 and that insofar as FIG. 5 is concerned there are no temples. It is conceivable, however, that under certain instances the omission of the nose bridge is most important because it relieves eyeglass wearers of indentations, sore noses and eliminates stress and pressure. Preferably the construction omits the temples too. However, it is within the purview of the invention to use temples (not shown) despite the fact that the usual curved end portions thereof are often objectionable because of sensitive ears.

Returning to FIG. 5 the U-shaped wire, plastic or equivalent adapter or frame means is denoted at 52 and is also of inverted U-shape form and comprises a bight portion 54 and depending arm or limb portions 56. The median parts of the limb portions are provided with U-bends 58 to which clips 60 connect. The clips are on the forward ends of the links 62 having eyes 64 to connect the attached end portions 66 of the elastic head embracing strap 68. Here again I employ a cross brace 70 between the limbs 56. In this arrangement the limbs have extra long extensions on their lower ends and the extensions are generally denoted in full lines at 72 in FIG. 8. This extra wire-end is bent upon itself as shown to provide lateral and forwardly directed offsetting portions 74 and clamping and retaining portions 76. The portions 74 and 76 are connected by curved or bent end portions 78 which actually extend through the plastic material from which the frame 50 is formed. Then, the terminal portions provide diagonal braces as at 80 and connect back with the aforementioned limbs. In other words, these portions 74 to 80 inclusive provide a sort of an offset mounting with which the frame 50 is connected and by way of which it is suspended in properly located position in front of the eye with which it cooperates. It follows that here again the wire or equivalent conformable adapter frame is chiefly U-shaped in form and has its arm portions provided with terminals that are properly offset to hang or suspend the lens frames.

It may be stated in connection with the above description that the use of the components 74 to 80 in providing a sort of a mounting is somewhat more complicated than it might have to be. In other words, the offsetting connection between the lower end of each limb 56 and lens can be simplified (not shown).

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in supporting and positioning a pair of cooperating lenses with said lenses properly located for use before the eyes of a user of eyeglasses or sunglasses, as the case may be; a readily applicable and removable holder for said lenses comprising an elongated inverted generally U-shaped adapter frame embodying a longitudinally bowed bight portion of a curvature and length that is adapted to bear conformably and comfortably against the forehead of the user and provided at its ends with lateral depending limb portions the lower ends of which terminate in a plane above the plane of the eyebrows of the user, the the lower ends of said limb portions having integral forwardly extending lens supporting and suspending members horizontally displaced and which when individually connected with their respective eye lenses properly position and hold the lenses before the user's eyes in correctly usable position, a brace of a length approximately the same as the length of said bight portion and disposed in spaced parallelism below the bight portion and located between the median portions of the respective limb portions and having its ends connected with said limb portions, said brace conformable in curvature with the bight portion, the brace, bight portion and limb portions cooperatively providing prescribed location and support for the lenses and obviating the need for a nose bridge, and means for applying and retaining the frame in restful but reliable contact with the forehead, said means comprising an elastic head-embracing strap and links connected to the forward ends of the strap and having their respective forward ends individually connected with said limb portions at points adjacent to which the ends of the brace are rigidly connected with said limb portions.

2. The structure defined in claim 1 and wherein said frame is constructed of wire and wherein the forward ends of said links are provided with readily attachable and detachable link retaining eyes, said limb portions being provided with laterally joined hooks with which said eyes are separably connected.

3. The structure defined in claim 1 and, in combination, a pair of eye lenses connected rigidly and directly to forwardmost end portions of said lens supporting members.

References Cited in the file of this patent

UNITED STATES PATENTS

| | | |
|---|---|---|
| 104,216 | Sickels | June 14, 1870 |
| 1,118,719 | Wirth | Nov. 24, 1914 |
| 1,289,998 | Yassukovitch | Dec. 31, 1918 |
| 1,376,234 | Taylor | Apr. 26, 1921 |
| 2,023,523 | Grimball | Dec. 10, 1935 |
| 2,449,694 | Froelich | Sept. 21, 1948 |
| 2,625,855 | Gaylor | Jan. 20, 1953 |

FOREIGN PATENTS

| | | |
|---|---|---|
| 91,244 | Switzerland | Oct. 17, 1921 |